US012260137B2

(12) United States Patent
Itogawa

(10) Patent No.: US 12,260,137 B2
(45) Date of Patent: Mar. 25, 2025

(54) PRINTING DEVICE CONVERTING RECEIVED COMMAND TO POST-CONVERSION COMMAND ACCORDING TO CONVERSION RULE

(71) Applicant: BROTHER KOGYO KABUSHIKI KAISHA, Nagoya (JP)

(72) Inventor: Yoshihiro Itogawa, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/536,703

(22) Filed: Dec. 12, 2023

(65) Prior Publication Data

US 2024/0211188 A1 Jun. 27, 2024

(30) Foreign Application Priority Data

Dec. 22, 2022 (JP) ................................ 2022-205556

(51) Int. Cl.
*G06F 3/12* (2006.01)
*H04N 1/00* (2006.01)
(52) U.S. Cl.
CPC .......... *G06F 3/1238* (2013.01); *G06F 3/1222* (2013.01); *G06F 3/1236* (2013.01); *H04N 1/00875* (2013.01)
(58) Field of Classification Search
None
See application file for complete search history.

(56) References Cited

U.S. PATENT DOCUMENTS

| 12,086,664 | B2* | 9/2024 | Osaki | G06K 15/4045 |
|---|---|---|---|---|
| 2014/0029035 | A1* | 1/2014 | Maruyama | G06F 3/1205 |
| | | | | 358/1.13 |
| 2018/0011665 | A1* | 1/2018 | Mano | G06F 3/1205 |
| 2022/0066708 | A1* | 3/2022 | Itogawa | G06F 3/1248 |
| 2023/0029436 | A1* | 1/2023 | Itogawa | G06F 3/1203 |

FOREIGN PATENT DOCUMENTS

JP 2014179018 A 9/2014

* cited by examiner

*Primary Examiner* — Haris Sabah
(74) *Attorney, Agent, or Firm* — Scully, Scott, Murphy & Presser, PC

(57) ABSTRACT

In a printing device, when: a memory stores a conversion rule for converting a pre-conversion PJL command to a post-conversion PJL command; and a PJL command corresponding to the pre-conversion PJL command is received, a controller performs a PJL command execution process to convert the received PJL command to the post-conversion PJL command according to the conversion rule and execute a process based on the post-conversion PJL command. On a condition that a rule-targeting command to execute a rule-targeting process targeting the conversion rule is received via a LAN interface according to a first protocol not ensuring a prescribed level of security, the controller prohibits execution of the rule-targeting process based on the rule-targeting command. On a condition that the rule-targeting command is received via an interface different from the LAN interface, the controller performs the rule-targeting process based on the rule-targeting command.

30 Claims, 13 Drawing Sheets

FIG. 6

$E_C$%−12345X@PJL

[HEADER INFORMATION PART OF CONVERSION-RULE
  TARGETING COMMAND ("WRITE" INSTRUCTION)]

PRE-CONVERSION PCL COMMAND1, POST-CONVERSION PCL COMMAND1 ⎫
PRE-CONVERSION PCL COMMAND2, POST-CONVERSION PCL COMMAND2 ⎬ F1
PRE-CONVERSION PCL COMMAND3, POST-CONVERSION PCL COMMAND3 ⎪
PRE-CONVERSION PCL COMMAND4, POST-CONVERSION PCL COMMAND4 ⎭

$E_C$%—12345X@PJL

[HEADER INFORMATION PART OF CONVERSION-RULE
 TARGETING COMMAND ("WRITE" INSTRUCTION)]

PRE-CONVERSION PJL COMMAND1, POST-CONVERSION PJL COMMAND1 ⎫
PRE-CONVERSION PJL COMMAND3, POST-CONVERSION PJL COMMAND2 ⎬ F1
PRE-CONVERSION PCL COMMAND3, POST-CONVERSION PCL COMMAND3 ⎪
PRE-CONVERSION PCL COMMAND4, POST-CONVERSION PCL COMMAND4 ⎭

```
EC%-12345X@PJL

[HEADER INFORMATION PART OF CONVERSION-RULE       ⎫ Ha2
  TARGETING COMMAND ("READ" INSTRUCTION)]         ⎬
                                                  ⎭ F1
EC%-12345X
```

FIG. 8B

```
EC%-12345X@PJL

[RESPONSE HEADER PART OF CONVERSION-RULE          ⎫ Hb2
  TARGETING COMMAND (PROCESS STATUS)]

PRE-CONVERSION PJL COMMAND1, POST-CONVERSION PJL COMMAND1 ⎫
PRE-CONVERSION PJL COMMAND2, POST-CONVERSION PJL COMMAND2 ⎬ F2
PRE-CONVERSION PJL COMMAND3, POST-CONVERSION PJL COMMAND3 ⎬
PRE-CONVERSION PJL COMMAND4, POST-CONVERSION PJL COMMAND4 ⎭

EC%-12345X
```

PRINTING DEVICE CONVERTING RECEIVED COMMAND TO POST-CONVERSION COMMAND ACCORDING TO CONVERSION RULE

REFERENCE TO RELATED APPLICATIONS

This application claims priority from Japanese Patent Application No. 2022-205556 filed on Dec. 22, 2022. The entire content of the priority application is incorporated herein by reference.

BACKGROUND ART

A conventional printing device is capable of receiving commands via a communication interface and executing processes in accordance with the received commands. The printing device analyzes PJL commands received via the communication interface and executes prescribed processes based on the results of analyzing these PJL commands.

DESCRIPTION

However, no conventional printing device include any considerations for security in the configuration for receiving commands via the communication interface.

In view of the foregoing, it is an object of the present disclosure to provide a printing device capable of receiving a command via a communication interface and executing processes in accordance with the command while improving security for the printing device.

In order to attain the above and other objects, according to one aspect, the present disclosure provides a printing device. The printing device includes a controller, a memory, a first communication interface, and a second communication interface. The controller is configured to perform: when: the memory stores a conversion rule for converting a pre-conversion printer job language (PJL) command to a post-conversion PJL command; and a PJL command corresponding to the pre-conversion PJL command is received via the first communication interface or the second communication interface, a PJL command execution process to convert the received PJL command to the post-conversion PJL command according to the conversion rule and execute a process based on the post-conversion PJL command; on a first condition including a condition that a rule-targeting command to execute a rule-targeting process targeting the conversion rule is received via the first communication interface, which is a local area network (LAN) interface, according to a first protocol not ensuring a prescribed level of security, prohibiting execution of the rule-targeting process based on the rule-targeting command; and on a second condition including a condition that the rule-targeting command is received via the second communication interface different from the LAN interface, the rule-targeting process based on the rule-targeting command.

According to another aspect, the present disclosure provides a printing device. The printing device includes a controller, a memory, and a communication interface. The controller is configured to perform: when: the memory stores a conversion rule for converting a pre-conversion printer job language (PJL) command to a post-conversion PJL command; and a PJL command corresponding to the pre-conversion PJL command is received via the communication interface, a PJL command execution process to convert the received PJL command to the post-conversion PJL command according to the conversion rule and execute a process based on the post-conversion PJL command regardless of whether the PJL command is received via the communication interface according to a first protocol ensuring a prescribed level of security or a second protocol ensuring the prescribed level of security; on a first condition including a condition that a rule-targeting command to execute a rule-targeting process targeting the conversion rule is received via the communication interface according to the first protocol, prohibiting execution of the rule-targeting process based on the rule-targeting command; and on a second condition including a condition that the rule-targeting command is received via the communication interface according to the second protocol, the rule-targeting process based on the rule-targeting command.

According to still another aspect, the present disclosure provides a printing device. The printing device includes a controller, a memory, a first communication interface, and a second communication interface. The controller is configured to perform: when: the memory stores a conversion rule for converting a pre-conversion page description language (PDL) command to a post-conversion PDL command; and a PDL command corresponding to the pre-conversion PDL command is received via the first communication interface or the second communication interface, a PDL command execution process to convert the received PDL command to the post-conversion PDL command according to the conversion rule and execute a process based on the post-conversion PDL command; on a first condition including a condition that a rule-targeting command to execute a rule-targeting process targeting the conversion rule is received via the first communication interface, which is a local area network (LAN) interface, according to a first protocol not ensuring a prescribed level of security, prohibiting execution of the rule-targeting process based on the rule-targeting command; and on a second condition including a condition that the rule-targeting command is received via the second communication interface different from the LAN interface, the rule-targeting process based on the rule-targeting command.

According to still another aspect, the present disclosure provides a printing device. The printing device includes a controller, a memory, and a communication interface. The controller is configured to perform: when: the memory stores a conversion rule for converting a pre-conversion page description language (PDL) command to a post-conversion PDL command; and a PDL command corresponding to the pre-conversion PDL command is received via the communication interface, a PDL command execution process to convert the received PDL command to the post-conversion PDL command according to the conversion rule and execute a process based on the post-conversion PDL command regardless of whether the PDL command is received via the communication interface according to a first protocol ensuring a prescribed level of security or a second protocol ensuring the prescribed level of security; on a first condition including a condition that a rule-targeting command to execute a rule-targeting process targeting the conversion rule is received via the communication interface according to the first protocol, prohibiting execution of the rule-targeting process based on the rule-targeting command; and on a second condition including a condition that the rule-targeting command is received via the communication interface according to the second protocol, the rule-targeting process based on the rule-targeting command.

In the above structure, the printing device can improve the security when the PJL command or the PCL command is received via the communication interface.

FIG. 6 is an explanatory diagram illustrating a conversion-rule targeting command targeting rules for PCL commands.

FIG. 7 is an explanatory diagram illustrating a conversion-rule targeting command targeting rules for PJL commands and PCL commands.

FIG. 8A is an explanatory diagram illustrating a conversion-rule targeting command.

FIG. 8B is an explanatory diagram illustrating response data.

EMBODIMENT

Figure 1:
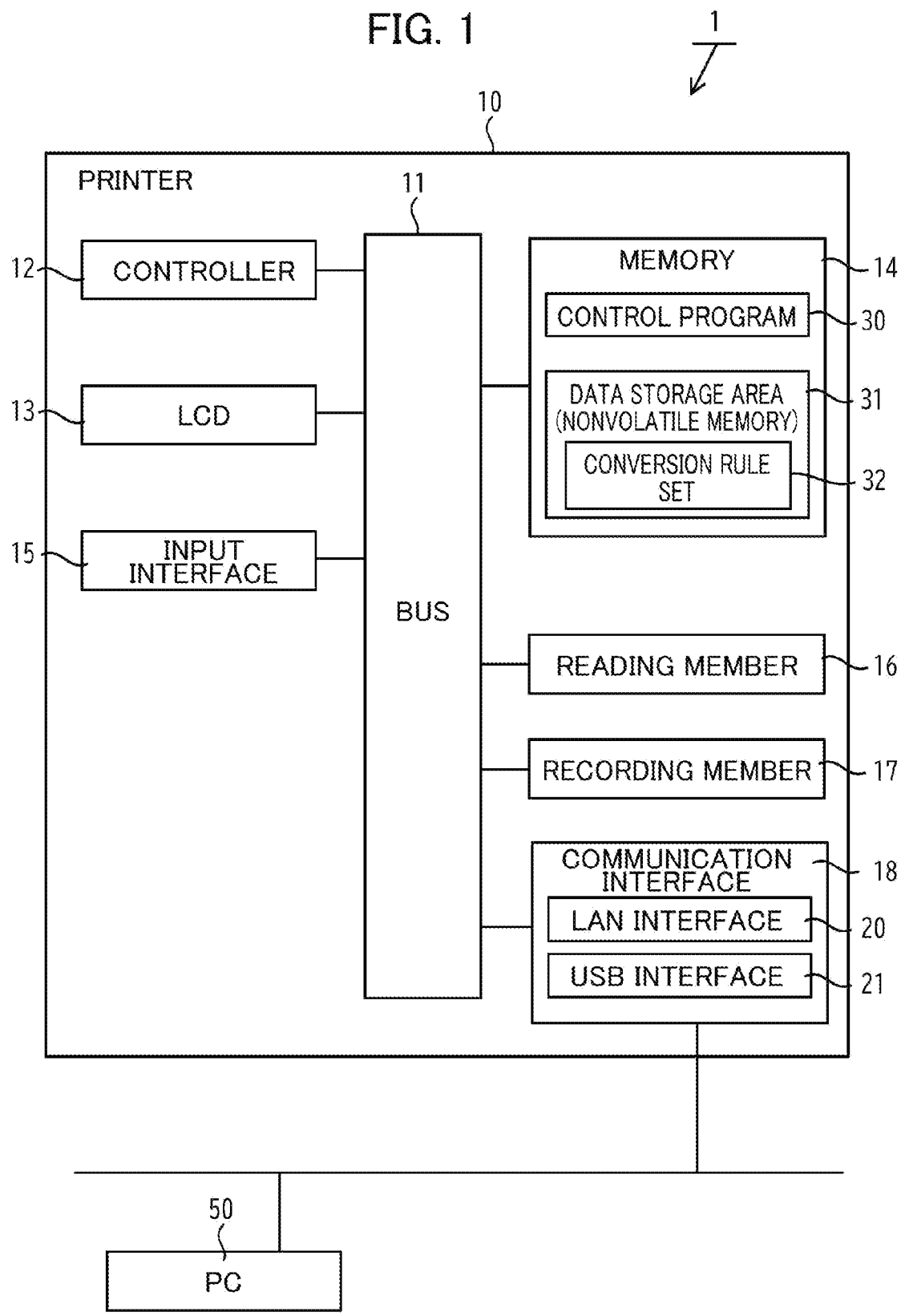
FIG. 1 is a block diagram illustrating an image formation system.

FIG. 1 is a block diagram showing an image formation system 1 according to the present embodiment. The image formation system 1 shown in FIG. 1 is provided with a printer 10 as an example of a printing device and a PC 50. The printer 10 is a device that can execute various processes including a printing process.

The printer 10 is provided with a controller 12, a liquid crystal display (LCD) 13, a memory 14, an input interface 15, a reading member 16, a recording member 17, and a communication interface 18. Here, "IF" is used as an abbreviation for "interface" in the drawings. These components can communicate with each other via a bus 11.

The printer 10 can communicate with the PC 50 via the communication interface 18. The communication interface 18 includes a LAN interface 20, and a USB interface 21. The LAN interface 20 is used for communication via a local area network (LAN) and a wide area network (WAN). The LAN interface 20 may be configured to execute wireless or wired communication. The LAN interface 20 is an example of a first communication interface. The USB interface 21 is used for inputting data from and outputting data to USB devices. The USB interface 21 is provided with one or more connectors for connecting a USB cable and a USB device such as USB memory. The USB interface 21 is an example of a second communication interface.

The controller 12 is provided with a CPU. In addition to the CPU, the controller 12 may also be configured of an application-specific integrated circuit (ASIC) and a plurality of logic integrated circuits. The controller 12 executes processes in accordance with a control program 30 stored in the memory 14. The memory 14 is also provided with a data storage area 31. The data storage area 31 stores data and the like necessary for executing the control program 30 and the like. The memory 14 further includes a nonvolatile memory such as ROM and flash memory, and a volatile memory such as RAM. The data storage area 31 may be provided in the nonvolatile memory (flush memory, for example) in the memory 14. The data storage area 31 can store a conversion rule set 32. The conversion rule set 32 is configured to include one or more conversion rules. Each conversion rule is used to convert a received command to a command that the printer 10 can interpret.

The memory 14 may include any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The LCD 13 displays various information on the printer 10. The display in this disclosure is not limited to a liquid crystal display but may be a display configured of another system such as an organic light-emitting diode (OLED) display. The input interface 15 is a touchscreen integrally configured with the display, for example. The input interface 15 receives user operations through icons, buttons, and the like displayed on the display. In addition to the touchscreen, the input interface 15 may include hard keys and the like.

The reading member (scanner) 16 is provided with an image sensor. The reading member 16 executes scanning operations to read images on a document with the image sensor. The recording member (printer) 17 is an electrophotographic printing mechanism, for example. Alternatively, the recording member 17 may be an inkjet printing mechanism. The recording member 17 may be a print engine and include a print head to form an image on a sheet.

In the following description, actions such as "determine," "extract," "select," "calculate," "decide," "identify," "acquire," "receive," "control," "set," and the like represent processes executed by the controller 12. Processes executed by the controller 12 include the processes according to the control program 30 and processes that control hardware through APIs provided in the OS. Hereinafter, the expressions such as "using the OS" are omitted when operations of programs are described. For example, the phrase "the program B controls the hardware C" may signify that the program B controls the hardware C using an API provided in the OS. A process executed by the controller 12 according to instructions described in a program may be described using abbreviated expressions, such as "the controller 12 executes."

Note that the term "acquire" in this specification is used as a concept that does not necessarily require a request. In other words, a process by which the controller 12 receives data without requesting that data is included in the concept of "the controller 12 acquires data." The term "data" described herein is expressed as bit strings that can be read by a computer. Data of different formats are treated as the same data when the content of the data is essentially the same. The same holds true for "information" in this specification. An "instruction," a "request," or the like is processed by communicating information indicating the "instruction," or the "request." The terms "instruction" and "request" may also be used to describe information indicating an "instruction" or a "request."

Further, a process executed by the controller 12 to determine whether information A indicates circumstance B may be described conceptually as "determining whether circumstance B based on information A." A process in which the controller 12 determines whether information A indicates circumstance B or circumstance C may be described conceptually as "determining whether circumstance B or circumstance C based on information A."

Figure 2:
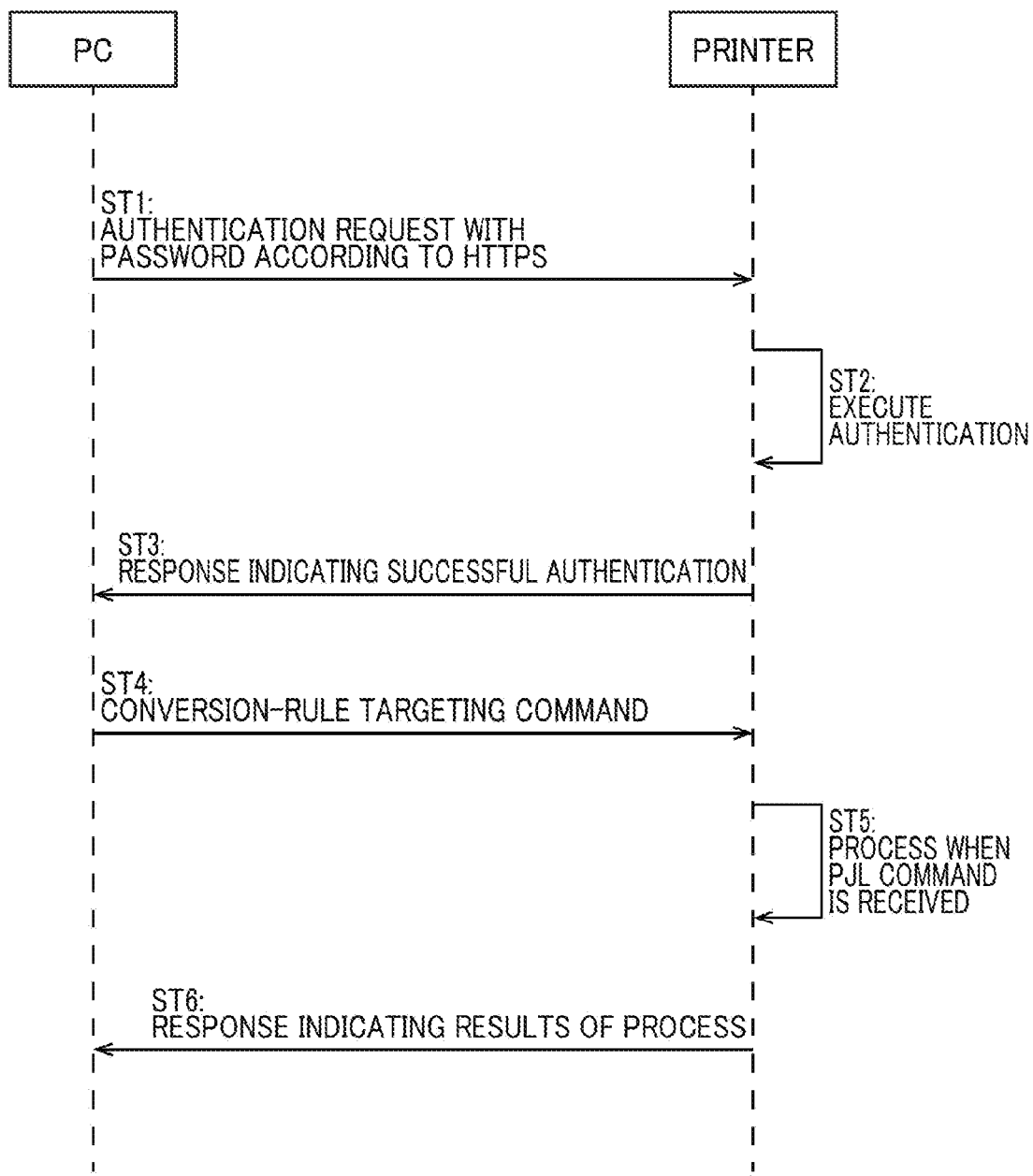
FIG. 2 is a sequence diagram illustrating a process in which a printer communicates with a personal computer with a communication interface.

Next, a process executed between the PC 50 and the printer 10 via the communication interface 18 will be described with reference to FIG. 2. FIG. 2 shows a sample process executed when the printer 10 receives a Printer Job Language (PJL) file outputted from the PC 50. Here, the printer 10 can receive PJL files outputted from the PC 50 via the LAN interface 20 or the USB interface 21 of the communication interface 18. When receiving PJL files via the LAN interface 20, the printer 10 can receive the PJL files according to the Hyper Text Transfer Protocol Secure (HTTPS) protocol or can receive the PJL files according to a specific communication protocol other than HTTPS. For example, the specific communication protocol is Hyper Text Transfer Protocol (HTTP), File Transfer Protocol (FTP), or Line Printer Daemon Protocol (LPR). Another example of the specific communication protocol is a protocol used by the Standard TCP/IP port monitor provided by Windows (U.S. trademark of Microsoft Corporation). Hereinafter, the protocol used by the Standard TCP/IP port monitor is simply referred to as "Standard TCP/IP port monitor" or "Standard TCP/IP port". The Standard TCP/IP port monitor is a protocol that uses, as a default port, port 9100 of TCP/IP to communicate according to the RAW protocol. The Standard TCP/IP port monitor may use port 515 to communicate according to the LPR protocol. The standard TCP/IP protocol that uses port 9100 may be abbreviated as "PORT 9100" protocol. The specific communication protocol is an example of a first protocol, and the HTTPS protocol is an example of a second protocol.

The HTTPS protocol is a protocol requiring a transmission device to send a password to a receiving device so that the receiving device permits the transmission device to transmit data when authentication using the password is successful. Accordingly, the HTTPS protocol ensures a prescribed level of security. The specific communication protocol, such as the port 9100 protocol, does not require a transmission device to send a password, and thus a receiving device permits the transmission device to transmit data without executing authentication. Accordingly, the specific communication protocol does not ensure the prescribed level of security.

First, a process in which the printer 10 receives a PJL file via the LAN interface 20 according to the HTTPS protocol will be described. HTTPS is a protocol that defines an authentication procedure by which a device on the transmitting side transmits a password to a device on the receiving side before sending data via the LAN interface 20. When the receiving device can authenticate the received password, the receiving device grants permission to the transmitting device to transmit data. HTTPS uses port 443 as the TCP/IP port. In ST1 of FIG. 2, the PC 50 transmits an authentication request containing a password to the printer 10 according to the procedure defined in HTTPS, while specifying 443 as the receiving side port number. The printer 10 receives the authentication request via the LAN interface 20 according to HTTPS.

The password that the PC 50 transmits to the printer 10 in ST1 may be any information that can uniquely identify the source of the authentication request, information that can uniquely identify the user operating the PC 50, or information that can uniquely identify the PC 50 or the application executed by this PC 50.

Upon receiving an authentication request, in ST2 the printer 10 executes a process to confirm the password included in the authentication request. Here, an authentication password may be stored in the memory 14 of the printer 10 in advance, for example. In this case, the controller 12 of the printer 10 confirms whether the password included in the authentication request matches the authentication password stored in the memory 14. When the passwords match, in ST3 the controller 12 returns a response to the PC 50 via the LAN interface 20 indicating that authentication was successful.

When an authentication successful response is received from the printer 10, in ST4 the PC 50 transmits the PJL file to the printer 10 according to HTTPS. The PJL file includes one or more PJL commands and other data, depending on the content. This example will assume that the PJL file includes a conversion-rule targeting command as the PJL command.

A conversion-rule targeting command is a PJL command instructing the execution of a process targeting one or more conversion rules, for example. Here, the one or more conversion rules targeted in the conversion-rule targeting command may be conversion rules included in the conversion rule set 32 stored in the memory 14. Alternatively, the conversion-rule targeting command may be a PJL command instructing execution of a process targeting the conversion rule set 32 stored in the memory 14. Further, the conversion-rule targeting command may be a PJL command instructing execution of a process modifying the conversion rule set. In this embodiment, the conversion rule set 32 is data or a file stored in the data storage area 31 of the memory 14 describing conversion rules (hereinafter, simply referred to as rules) for converting commands included in PJL files to other commands. The conversion rule is a rule mapping a pre-conversion command to a post-conversion command. In the present embodiment, the conversion rule set 32 includes rules for converting PJL commands to other PJL commands and rules for converting Printer Command Language (PCL) commands to other PCL commands, as will be described later. The PCL command is an example of the Page Description Language (PDL) command. For example, a printer driver manufactured by a third party or a vendor other than the vendor of the printer 10 may instruct the printer 10 using another company's proprietary PJL commands. When the printer 10 receives a PJL file including another company's proprietary PJL commands, it is conceivable that the controller 12 is unable to interpret those proprietary PJL commands and the commands may not yield the expected result. Accordingly, when receiving proprietary PJL commands developed by another company, the controller 12 uses the conversion rules included in the conversion rule set 32 to convert the proprietary PJL commands to commands that the controller 12 can interpret.

Figure 3:
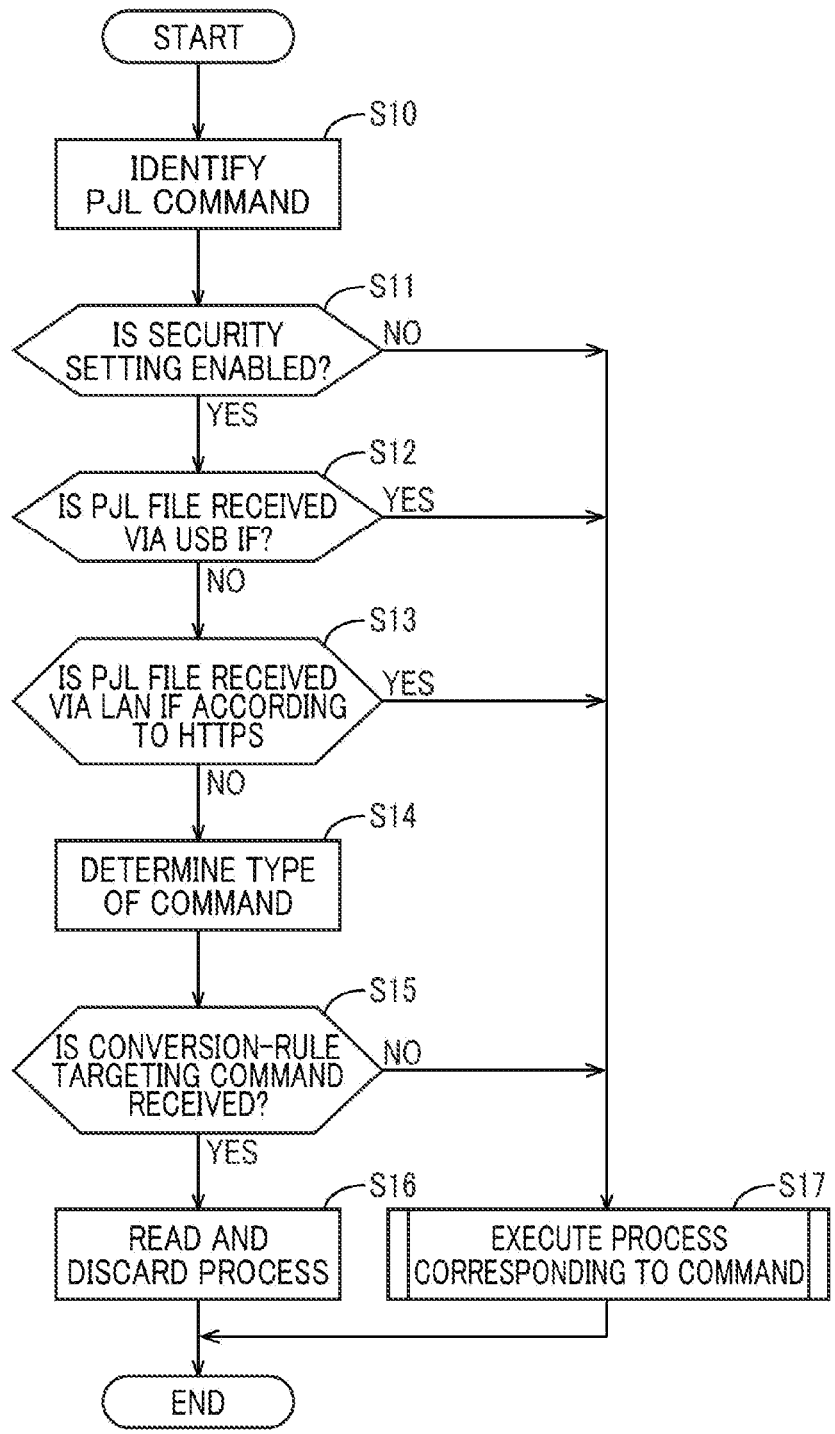
FIG. 3 is a flowchart illustrating a process executed by the printer when the PJL file is received.

In ST4 the printer 10 receives a conversion-rule targeting command in the PJL file, which is received via the LAN interface 20 according to HTTPS. Upon receiving the PJL file, the printer 10 executes the process of ST5. Here, the process of ST5 when the controller 12 receives the PJL file containing the PJL command will be described with reference to FIG. 3. When the PJL file includes a plurality of commands, the process shown in FIG. 3 is executed on each of the commands. In S10 of FIG. 3, the controller 12 identifies the PJL command included in the PJL file.

In S11 the controller 12 references configuration information stored in the memory 14 to determine whether a PJL security setting has been enabled. The PJL security setting indicates whether security measures are to be executed for processes using PJL commands. This PJL security setting is enabled or disabled in a settings screen (not shown) at a separate timing from the timing at which the process in FIGS. 2 and 3 is executed. For example, the controller 12 displays a settings screen on the LCD 13 in response to operations via the input interface 15. The settings screen includes a radio button for enabling the PJL security setting, and a radio button for disabling the PJL security setting. When the user executes an operation in the settings screen through the input interface 15 to select the radio button specifying "Enable," the controller 12 stores configuration information in the memory 14 indicating that the PJL security setting was enabled. When the user executes an operation to select the radio button specifying "Disable," the controller 12 stores configuration information in the memory 14 indicating that the PJL security setting was disabled. Thus, the user can switch the PJL security setting in this way. Note that the PJL security setting is enabled when the printer 10 is shipped from the factory.

When the PJL security setting is not enabled (S11: NO), the controller 12 advances to S17 and executes a process corresponding to the type of the command included in the PJL file. That is, when the PJL security setting has been disabled, restrictions need not be set on processes targeting one or more conversion rules described later. The process of S17 will be described later in greater detail. However, when the PJL security setting has been enabled (S11: YES), in S12 the controller 12 determines whether the PJL file was received via the USB interface 21. Since the PJL file was received via the LAN interface 20 in this example (S12: NO), the controller 12 advances to S13.

In S13 the controller 12 determines whether the PJL file was received via the LAN interface 20 according to HTTPS. Since the PJL file was received via the LAN interface 20 according to HTTPS in this example (S13: YES), the controller 12 advances to S17 and executes a process corresponding to the data type of the PJL command in the PJL file. In other words, security is ensured when a YES determination is reached in S13, eliminating the need to restrict processes targeting one or more conversion rules in S17 described below.

Figure 4:
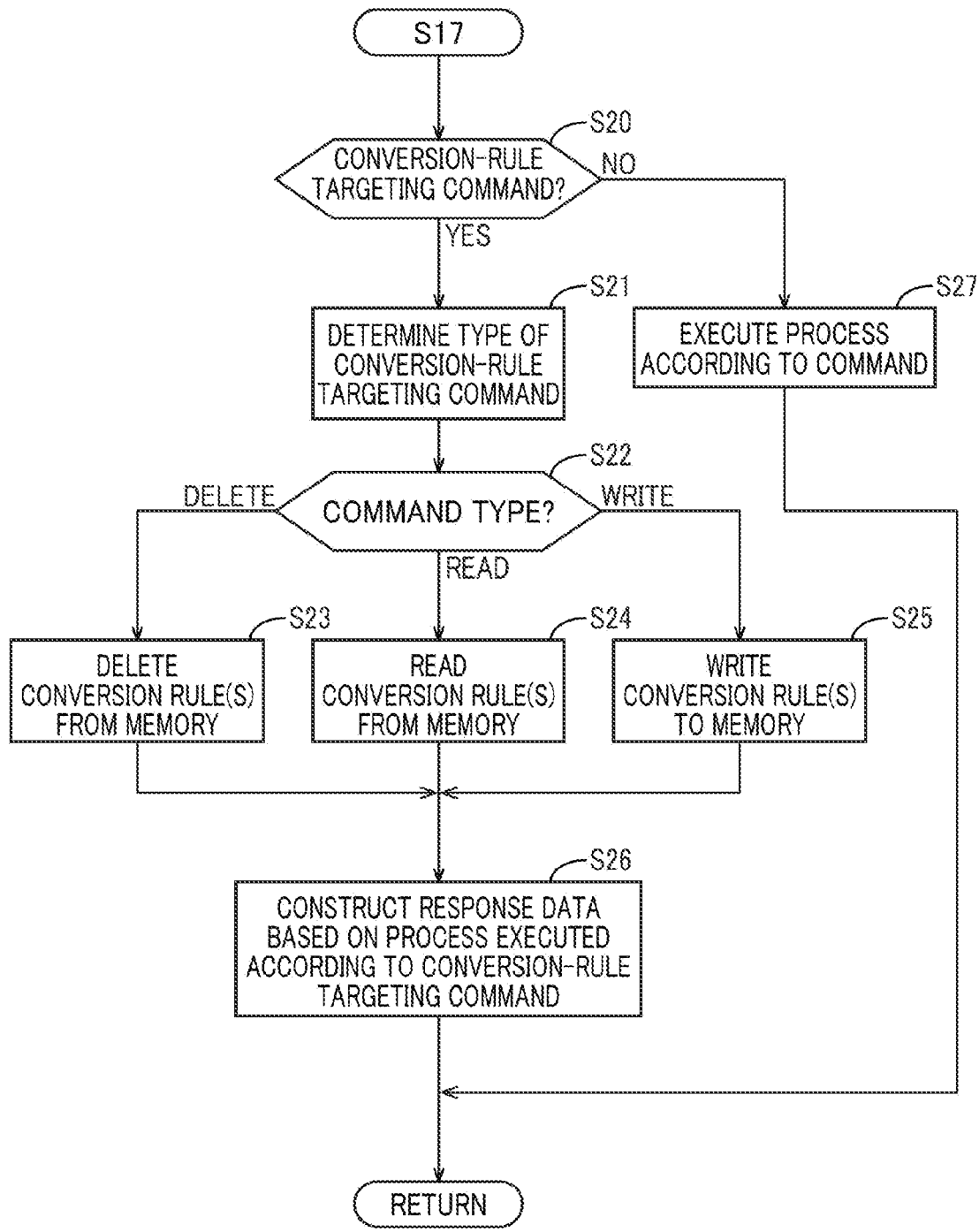
FIG. 4 is a flowchart illustrating a detailed process of S17 shown in FIG. 3.

FIG. 4 is a flowchart illustrating steps in the process of S17. In S20 of FIG. 4, the controller 12 determines whether the type of the command in the PJL file, is a conversion-rule targeting command. When the command included in the PJL file is not of a conversion-rule targeting command type (S20: NO), in S27 the controller 12 executes a process according to the command in the PJL file. Subsequently, the controller 12 returns to FIG. 3 and ends the process.

However, when the command in the PJL file is of the conversion-rule targeting command type (S20: YES), in S21 the controller 12 determines the command type of the conversion-rule targeting command. In this embodiment, there are three types of conversion-rule targeting commands: "Read," "Write," and "Delete." The command type "Read" is a PJL command instructing the controller 12 to read one or more conversion rules from the conversion rule set 32 stored in the memory 14. The command type "Write" is a PJL command instructing the controller 12 to write one or more conversion rules to the conversion rule set 32 in the memory 14 or to rewrite one or more conversion rules included in the conversion rule set 32 stored in the memory 14. The command type "Delete" is a PJL command instructing the controller 12 to delete one or more conversion rules in the conversion rule set 32 or delete the conversion rule set 32.

Figure 5A:
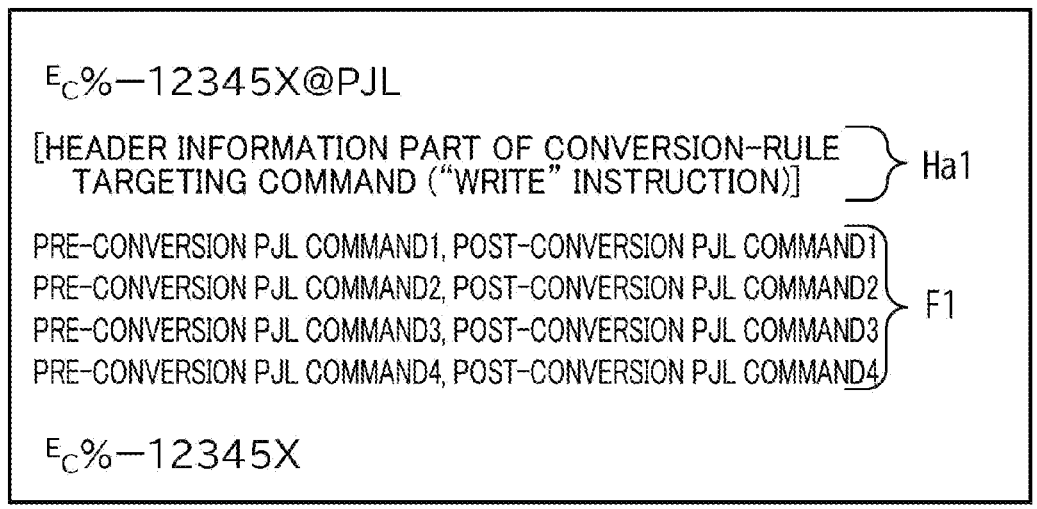
FIG. 5A is an explanatory diagram illustrating a conversion-rule targeting command.

When the command type of the conversion-rule targeting command is "Write," in S25 the controller 12 newly writes one or more conversion rules to the conversion rule set 32 of the data storage area 31 or rewrites one or more conversion rules in the conversion rule set 32 in accordance with the conversion-rule targeting command. FIG. 5A shows a conversion-rule targeting command of the command type "Write." The conversion-rule targeting command includes the text "EC%-12345X@PJL" indicating the beginning of the command. In the lines following this line are a header information part Ha1, and a conversion rules part F1.

In the conversion-rule targeting command shown in FIG. 5A, the header information part Ha1 includes information indicating the type of the conversion-rule targeting command is "Write." The conversion rules part F1 describes one or more conversion rules to be written to or rewritten in the conversion rule set 32. Each rule is configured of a combination of a "pre-conversion PJL command N" denoting the PJL command subject to conversion and a "post-conversion PJL command N" denoting the PJL command to which the pre-conversion PJL command N is converted. The conversion rule set 32 can store a plurality of conversion rules. Here, N is a natural number indicating an identifier.

The controller 12 determines whether each "pre-conversion PJL command N" of rules included in the conversion rules part F1 corresponds to any one of the "pre-conversion PJL commands" of conversion rules included in the conversion rule set 32. Here, "correspond to" is a concept that signifies "the same as," for example. However, "correspond to" may also include the concept of not being the same as but being regarded as the same when certain rules are followed.

The controller 12 writes, to the conversion rule set 32, all rules described in the conversion rules part F1 whose "pre-conversion PJL command N" does not correspond to the "pre-conversion PJL command" of any rule included in the conversion rule set 32. Specifically, when "pre-conversion PJL command 1" does not correspond to the pre-conversion PJL command of any rule in the conversion rule set 32, the controller 12 writes a rule that is a combination of "pre-conversion PJL command 1" and "post-conversion PJL command 1" to the conversion rule set 32. The same process holds for rules whose target is a PCL command. FIG. 6 shows a conversion-rule targeting command targeting one or more conversion rules for PCL commands. When "pre-conversion PCL command 3" included in the conversion rules part F1 of this example does not correspond to the pre-conversion PCL command of any rule in the conversion rule set 32 for example, the controller 12 writes the rule of the conversion rules part F1 to the conversion rule set 32 that includes a combination of "pre-conversion PCL command 3" and "post-conversion PCL command 3." Thus, the controller 12 adds a new rule to the conversion rule set 32.

For rules described in the conversion rules part F1 whose "pre-conversion PJL command N" corresponds to the "pre-conversion PJL command N" of a rule in the conversion rule set 32, the controller 12 overwrites the corresponding (or found) rule of the conversion rule set 32 using the post-conversion PJL command N in the conversion rules part F1 so that the overwritten rule describes the correlation between the pre-conversion PJL command N and the post-conversion PJL command N in the conversion rules part F1. As a specific example, when "pre-conversion PJL command 2" in the conversion rules part F1 corresponds to the pre-conversion PJL command of one conversion rule in the conversion rule set 32, the controller 12 overwrites that rule in the conversion rule set 32 so that the "post-conversion PJL command" originally included in the rule of the conversion rule set 32 is replaced with "post-conversion PJL command 2" in the conversion rules part F1. The same process applies to conversion rules targeting PCL commands. Specifically, when "pre-conversion PCL command 4" in the conversion-rule targeting command shown in FIG. 6 corresponds to the pre-conversion PCL command of one conversion rule in the conversion rule set 32, the controller 12 overwrites that rule in the conversion rule set 32 so that the "post-conversion PCL command" originally included in that rule is replaced with the "post-conversion PCL command 4" in the conversion rules part F1. In this way, the controller 12 modifies part of the corresponding rule in the conversion rule set 32.

The process targeting one or more conversion rules of the conversion rule set 32 executed in S17 may employ a conversion-rule targeting command that targets rules for both PJL command(s) and PCL command(s). In the sample conversion-rule targeting command illustrated in FIG. 7, the conversion rules part F1 describes a rule including a combination of "pre-conversion PJL command 1" and "post-conversion PJL command 1"; a rule including a combination of "pre-conversion PJL command 2" and "post-conversion PJL command 2"; a rule including a combination of "pre-conversion PCL command 3" and "post-conversion PCL command 3"; and a rule including a combination of "pre-conversion PCL command 4" and "post-conversion PCL command 4." In S25 of FIG. 4 the controller 12 writes conversion rules to the conversion rule set 32 or rewrites conversion rules in the conversion rule set 32 in the data storage area 31 according to the conversion-rule targeting command illustrated in FIG. 7, for example. The same process applies to conversion-rule targeting commands having the command type "Read" and "Delete" described later.

Figure 5B:
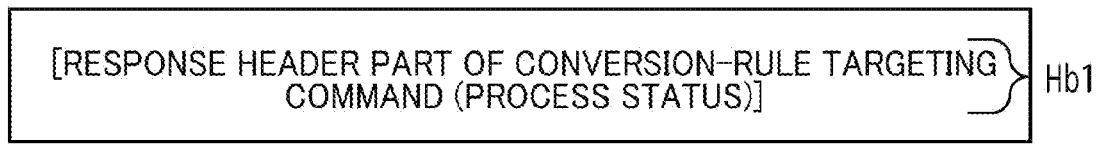
FIG. 5B is an explanatory diagram illustrating response data.

After completing a write or rewrite of the conversion rules in the conversion rule set 32 in S25, in S26 the controller 12 constructs response data based on results of the process of S25. As a specific example, when the controller 12 executes a process targeting one or more conversion rules using the conversion-rule targeting command shown in FIG. 5A, the controller 12 constructs the response data shown in FIG. 5B. This response data includes a response header part Hb1. The response header part Hb1 describes the process status for the process using the conversion-rule targeting command. Examples of process statuses include "success," "no target file (or no target data)," "end not detected," and "parameter analysis not possible." The process status "success" indicates that the process according to the corresponding conversion-rule targeting command "Read," "Write," or "Delete" was executed successfully. The process status "no target file (or no target data)" indicates that there is no file (or data) to be read according to the conversion-rule targeting command "Read" or no file (or data) to be deleted according to the conversion-rule targeting command "Delete." In other words, a "no target file (or no target data)" process status indicates that some of the conversion rules of reading or deletion target are not included in the conversion rule set 32 stored in the data storage area 31 or no conversion rules of reading or deletion target are not included in the conversion rule set 32. The process status "end not detected" indicates that the conversion-rule targeting command is cut off in the middle and could not be processed. The process status "parameter analysis not possible" indicates that the content of the conversion-rule targeting command is not analyzable and could not be processed.

Returning to S22 in FIG. 4, when the command type of the conversion-rule targeting command is "Read," in S24 the controller 12 reads the conversion rules included in the conversion rule set 32 stored in the memory 14 in accordance with the conversion-rule targeting command. FIG. 8A shows a conversion-rule targeting command having the command type "Read."

A header information part Ha2 in the conversion-rule targeting command shown in FIG. 8A includes information specifying the type of the conversion-rule targeting command is "Read." The conversion rules part F1 in the conversion-rule targeting command of FIG. 8A does not include any information since the reading target is all of the conversion rules included in the conversion rule set 32. When the conversion rules part F1 includes data identifying rules that are the reading target, the controller 12 may read only those rules identified by this data from the conversion rule set 32 as the reading target. Data in the conversion rules part F1 identifying a rule as the reading target may be a rule name of the reading target, a "pre-conversion PJL command" that is included in the rule of the reading target, or a "pre-conversion PCL command" that is included in the rule of the reading target. The controller 12 reads the conversion rules included in the conversion rule set 32 stored in the memory 14 to a volatile area of memory in accordance with the conversion-rule targeting command shown in FIG. 8A.

After the controller 12 has finished reading the target conversion rules from the conversion rule set 32 in S24, in S26 the controller 12 constructs response data based on the results of the process of S24. As a specific example, when the controller 12 has executed a process targeting the conversion rules according to the conversion-rule targeting command shown in FIG. 8A, the controller 12 constructs the response data shown in FIG. 8B. The response data in the example of FIG. 8B includes a response header part Hb2, and a response conversion rule part F2. As with the example described in FIG. 5B, the response header part Hb2 in FIG. 8B includes the process status for the process executed using the conversion-rule targeting command in FIG. 8A. The response conversion rule part F2 includes the conversion rules read from the conversion rule set 32 in accordance with the conversion-rule targeting command "Read."

Figure 9A:
FIG. 9A is an explanatory diagram illustrating a conversion-rule targeting command.

Further, when the command type of the conversion-rule targeting command is "Delete," in S23 the controller 12 deletes the conversion rules from the conversion rule set 32 stored in the data storage area 31 in accordance with the conversion-rule targeting command. FIG. 9A shows a conversion-rule targeting command whose command type is "Delete."

A header information part Ha3 in the conversion-rule targeting command shown in FIG. 9A includes information indicating that the type of the conversion-rule targeting command is "Delete." The conversion rules part F1 in the conversion-rule targeting command of FIG. 9A includes no information since the target of deletion is all of the conversion rules included in the conversion rule set 32. However, when the conversion rules part F1 includes data identifying specific rules that are targeted for deletion, the controller 12 may set only those rules in the conversion rule set 32 identified by this data as the deletion target. Data in the conversion rules part F1 used to identify a rule may be a rule name of the deletion target, or other identification data such as a "pre-conversion PJL command" that is included in a rule of the deletion target or a "pre-conversion PCL command" that is included in a rule of the deletion target. The controller 12 deletes all or part of the conversion rules included in the conversion rule set 32 stored in the memory 14 in accordance with the conversion-rule targeting command of FIG. 9A. When the deletion target is all of the conversion rules in the conversion rule set 32, the controller 12 may delete the entire conversion rule set 32.

Figure 9B:
FIG. 9B is an explanatory diagram illustrating response data.

After the controller 12 has finished deleting the targeted conversion rules from the conversion rule set 32 in S23, in S26 the controller 12 constructs response data based on the results of the process of S23. When the controller 12 has executed a process targeting one or more conversion rules based on the conversion-rule targeting command shown in FIG. 9A, the controller 12 constructs the response data shown in FIG. 9B. The response data in this example includes a response header part Hb3. As in the example described in FIG. 5B, the response header part Hb3 includes the process status for the process executed according to the conversion-rule targeting command of FIG. 9A.

Returning to FIG. 2, in ST6 the controller 12 of the printer 10 transmits the response data constructed in S26 of FIG. 4 to the PC 50 via the LAN interface 20. On the basis of the content of this response data, the PC 50 can confirm the results of the process targeting one or more conversion rule and can execute subsequent processes. In a case that the PJL file includes a plurality of commands, the process of ST6 may be executed each time the process of FIG. 3 is ended for one command or after the processes for all the commands included in the PJL file are ended.

Next, a process executed when the printer 10 receives a PJL file according to a communication protocol other than HTTPS will be described with reference to FIG. 10. Many clients that transmit PJL files to printers 10 use "Port 9100" protocol described above as the specific communication protocol (the non-HTTPS communication protocol). For example, Windows (registered trademark) uses port 9100 as the standard TCP/IP port for communicating with printers. Unlike HTTPS, the Port 9100 protocol does not specify an authentication procedure. Accordingly, the sequence chart shown in FIG. 10 does not include a step in which the PC 50 sends an authentication request to the printer 10 or a step in which the printer 10 authenticates a password.

In ST11 the PC 50 transmits a PJL file to the printer 10 that includes a conversion-rule targeting command, while specifying 9100 as the port number. The printer 10 receives the PJL file via the LAN interface 20 according to the Port 9100 protocol. Thus, when the printer 10 receives this PJL file, in ST12 the printer 10 starts the process similarly to the process of ST5 of FIG. 2 when receiving a PJL file containing one or more PJL commands.

The process of ST12 when using the Port 9100 protocol will be described with reference to FIG. 3. In a case that the controller 12 determines in S11 that the PJL security setting has been disenabled (S11: NO), the controller 12 executes the process of S17 as described above. In a case that the controller 12 determines in S11 that the PJL security setting has been enabled (S11: YES), the controller 11 determines in S12 that the PJL file was received via the LAN interface 20 (S12: NO), determines in S13 that the PJL file was received according to the Port 9100 protocol (S13: NO), and advances to S14.

In S14 the controller 12 determines the type of the command included in the PJL file. When the command included in the PJL file is of a conversion-rule targeting command type (S15: YES), in S16 the controller 12 executes a read and discard process (or a skipping process) on the PJL command. In the read and discard process, the controller 12 skips over the content described from the beginning of the PJL command "EC%-12345X@PJL" to the end "EC%-12345X", thereby not executing a process in accordance with the conversion-rule targeting command included in the PJL file. In other words, the controller 12 does not execute a process targeting one or more conversion rules since the conversion-rule targeting command was received according to Port 9100 protocol for which security is not ensured.

Figure 10:
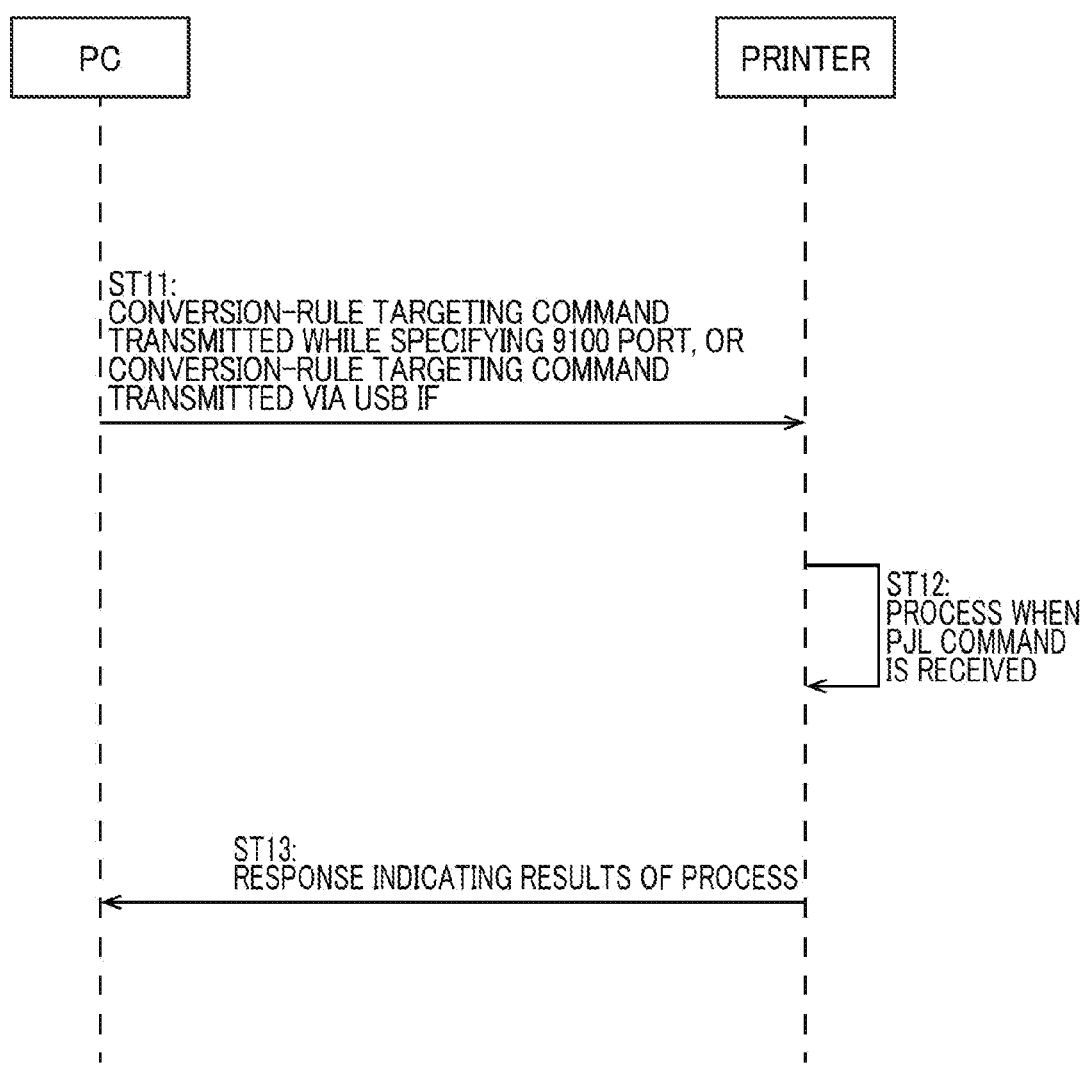
FIG. 10 is a sequence diagram illustrating a process in which the printer communicates with the personal computer with the communication interface.

When executing the read and discard process in S16, the controller 12 constructs response data indicating that a process targeting one or more conversion rules was not executed as the process status and transmits this response data to the PC 50 in ST13 of FIG. 10. Alternatively, the controller 12 need not execute the process of ST13 after executing the read and discard process of S16. When the controller 12 determines in S15 that the PJL file received from the PC 50 includes a command other than a conversion-rule targeting command (S15: NO), in S17 the controller 12 executes a process corresponding to the command type included in the PJL file. Returning to FIG. 10, in ST13 the controller 12 of the printer 10 transmits response data to the PC 50 via the USB interface 21 when response data was constructed in S26 of FIG. 4.

In a case that the PJL file includes a plurality of commands, the process of ST13 may be executed each time the process of FIG. 3 is ended for one command or after the processes for all the commands included in the PJL file are ended.

Next, a process executed when the printer 10 receives a PJL file via the USB interface 21 will be described. For example, when the user connects the PC 50 to the printer 10 with a USB cable, the PC 50 can transmit a PJL file to the printer 10 through the USB cable as indicated in ST11 of FIG. 10. When the controller 12 of the printer 10 receives a PJL file via the USB interface 21, the controller 12 executes the process indicated in ST12 of FIG. 10 when receiving a PJL file containing one or more PJL commands.

The process executed when the PJL file was received via the USB interface 21 will be described with reference to FIG. 3. In a case that the controller 12 determines in S11 that the PJL security setting has been disenabled (S11: NO), the controller 12 executes the process of S17 as described above. In a case that the controller 12 determines in S11 that the PJL security setting has been enabled (S11: YES), the controller 12 determines in S12 that the PJL file was received via the USB interface 21 (S12: YES), and in S17 executes a process corresponding to the type of data included in the PJL file. Since the process of S17 has already been described with reference to FIG. 4, a description of this process will not be repeated here.

In the embodiment, the process of ST5 in FIG. 2, the process of ST12 in FIG. 10, and the process shown in FIG. 3 are examples of the conversion rule targeting process.

Returning to FIG. 10, in ST13 the controller 12 of the printer 10 transmits the response data constructed in S26 of FIG. 4 to the PC 50 via the USB interface 21. In this case, in a case that the PJL file includes a plurality of commands, the process of ST3 may be executed each time the process of FIG. 3 is ended for one command or after all the processes for all the commands included in the PJL file are ended.

Next, a process that the controller 12 of the printer 10 executes in ST5 of FIG. 2 or ST12 of FIG. 10 upon receiving a PJL file specifying a print job will be described with reference to FIG. 12. As will be described later, a PJL file specifying a print job includes one or more PJL commands and image data (a PDL part 42 described later). In the present embodiment, when the controller 12 receives one or more PJL commands together with image data, the controller 12 executes a printing process based on the image data by executing processes in accordance with the PJL commands, irrespective of the communication path, such as the communication interface 18 or the protocol used for communication. In other words, when the controller 12 receives PJL commands in a PJL file that specifies a print job, the controller 12 executes printing based on the print job in accordance with the PJL command(s) and/or PCL command(s) described later included in the print job, without altering the process according to the type of communication interface 18 or the type of protocol. That is, when the print job including the PJL and/or PCL command(s) is received, the controller 12 executes the printing based on irrespective of whether the print job is received via the LAN interface 20 or the USB interface 21 and irrespective of whether the print job is received via the HTTPS protocol or the port 9100 protocol.

Figure 12:
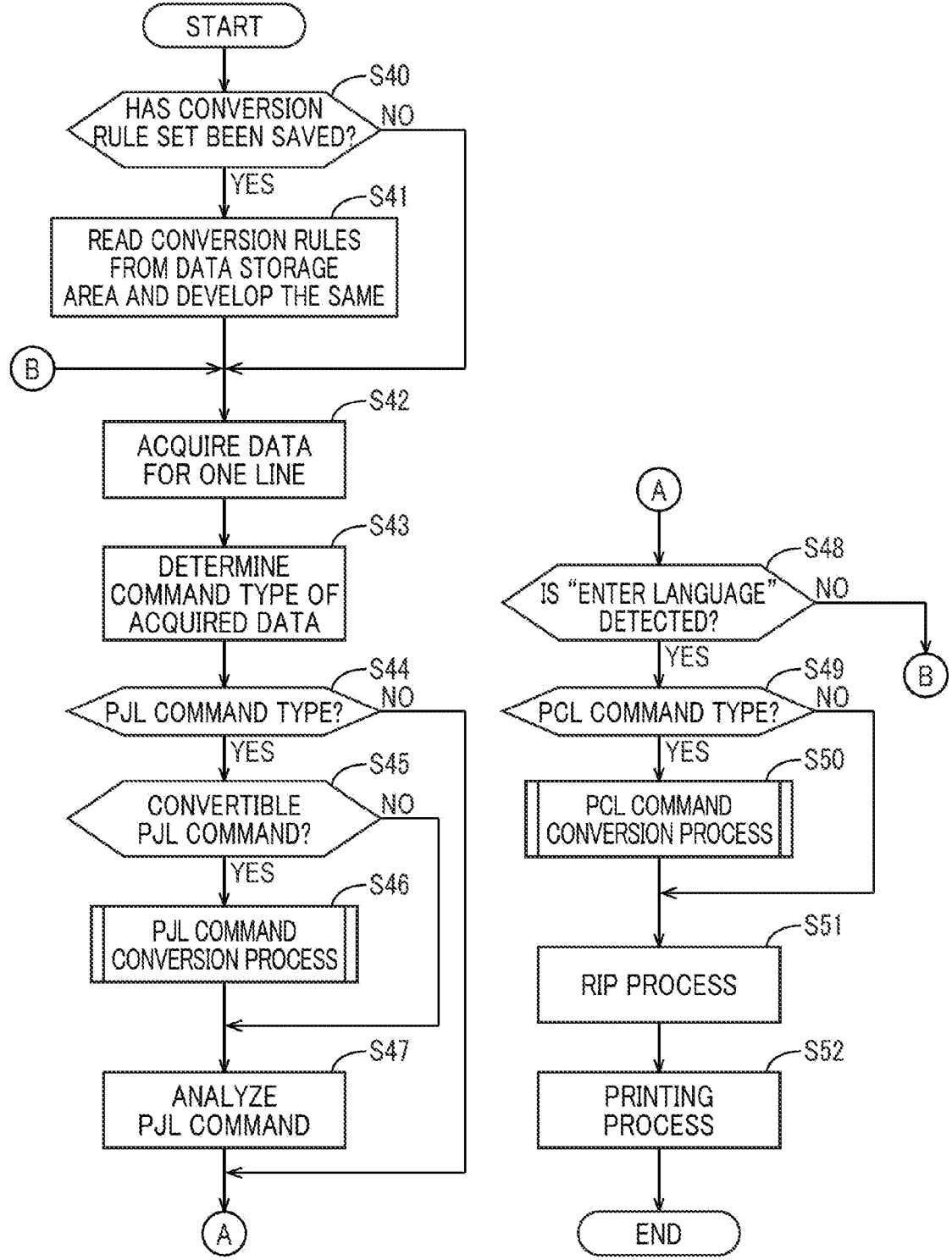
FIG. 12 is a flowchart illustrating a process executed by the printer when the print job is received.

In S40 at the beginning of FIG. 12, the controller 12 determines whether the conversion rule set 32 has been saved in the memory 14. When the controller 12 determines that no conversion rule set 32 is saved in the memory 14, that is, no conversion rules are saved in the memory 14 (S40: NO), the controller 12 advances to S42. However, when the conversion rule set 32 has been saved in the memory 14 (S40: YES), in S41 the controller 12 reads the conversion rules from the conversion rule set 32 in the data storage area 31 and develops these conversion rules in RAM, i.e., volatile memory. Note that when one or more conversion rules have been developed and stored in RAM in advance, the process of S41 may be omitted.

Figure 11:
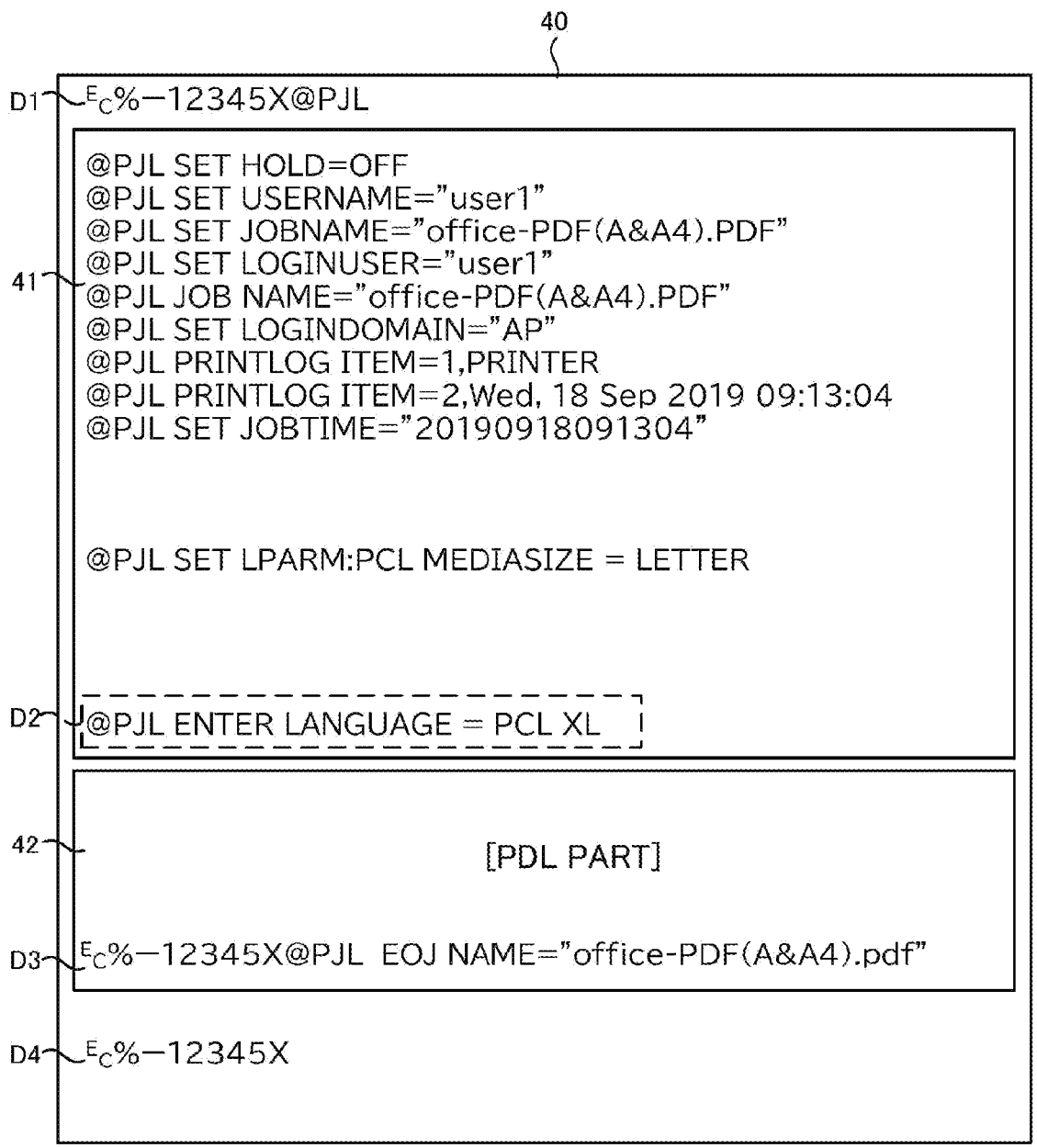
FIG. 11 is an explanatory diagram illustrating a print job.

In S42 the controller 12 acquires data for one line contained in the PJL file. FIG. 11 shows the structure of a PJL file 40 specifying a print job. The PJL file 40 includes a PJL part 41 including PJL commands instructing the printing of an image, and a PDL part 42 including descriptions in a page description language instructing the drawing of image data. The top of the PJL file 40 has data D1 indicating the beginning of the PJL file. Here, the data D1 includes "EC%-12345X@PJL". The data D1 indicates that the PJL part 41 begins from the next line. PJL commands provided in the PJL part 41 include a command indicating that data is image data (or indicating starting of image data or starting of a PDL part), a command specifying the job name for the print job, a command specifying the username for the print job, a command specifying printing parameters to be used when printing, and a command indicating whether the print job is to be printed according to a special method. An example of the special method is a method of storing the print job in the memory 14 rather than printing immediately and subsequently printing the print job in response to instructions received through operations on the input interface 15. The PJL commands may also include a command indicating where the image data begins in the print job, and a command indicating the format of the PDL part 42. Example formats of the PDL part 42 are Printer Command Language (PCL), PostScript (PS; PostScript is a U.S. trademark of Adobe Inc.), Portable Document Format (PDF), Joint Photographic Experts Group (JPEG), and RAW.

The PJL part 41 also includes a command D2. In this example, the command D2 is "@PJL ENTER LANGUAGE=PCL XL" signifying that the PDL part 42 begins in the middle of the PJL file 40, and specifically from the next line. In this embodiment, the command D2 indicates that PCL is used as the data type of the page description language included in the PDL part 42. The PDL part 42 includes data D3. The data D3 in this example is "EC%-12345X@PJL EOJ NAME='office-PDF (A&A4).pdf'", which is a command specifying the end of the PDL part 42. Data D4 "EC%-12345X" is provided on the line following the data D3 line to indicate the end of the PJL file, i.e., the end of the data specifying the print job.

In S43 of FIG. 12 the controller 12 determines the type of the command included in the data for the line acquired in S42. When the acquired data of the line begins with the tag "@PJL", the controller 12 determines that the command included in the currently acquired data is of the PJL command type. In S44 the controller 12 determines whether the command included in the acquired data is of a PJL command type. When the command included in the acquired data is not of the PJL command type (S44: NO), the controller 12 advances to S48. For example, when the data acquired in S42 is the data D1 indicating the beginning of the PJL file, the controller 12 determines that the command is not of the PJL command type because the line in the data D1 does not begin with the tag "@PJL" (S44: NO), and the controller 12 advances to S48.

In S48 the controller 12 determines whether the data acquired in S42 for the current line includes a command indicating that a next line of the current line is the start line of the PDL part 42. When the command of the current line is not the command D2 (S48: NO), the controller 12 returns to S42.

In S42 the controller 12 acquires data for the next line following the current line and in S43 determines whether the command included in the newly acquired data is of the PJL command type. When the command included in the newly acquired data is of the PJL command type (S44: YES), in S45 the controller 12 determines whether the PJL command is a convertible PJL command that can be converted according to the conversion rules in the conversion rule set 32. For example, the memory 14 may store a list of PJL commands for which conversion is prohibited. Any PJL command not included in this list corresponds to a convertible PJL command for which conversion is permitted. That is, when the PJL command included in the newly acquired data does not correspond to any one of the commands in the prohibition list, the controller 12 determines that the PJL command in the newly acquired data is a command for which conversion is permitted. PJL commands included in the prohibition list may be PJL commands that should be executed without conversion. That is, the PJL commands in the prohibition list will be executed without any conversion. Or, PJL commands included in the prohibition list may be PJL commands that have potential risks that these PJL commands may be converted to PJL commands that may cause any problems when executed under specific situations. Examples of PJL commands having potential risks for which conversion is prohibited are a PJL command instructing the printer 10 to upload a file stored on the printer 10 to the network, and a PJL command instructing the printer 10 to delete a file. When the newly acquired PJL command is not a convertible PJL command (S45: NO), the controller 12 advances to S47 without executing the process of S46 described later to convert the PJL command. This configuration can shield the printer 10 from attacks by malicious individuals attempting to upload or delete files on the printer 10 when the printer 10 is connected to a network such as the Internet. In other words, this configuration enhances security for the printer 10. The conversion rule set 32 may include conversion rules for converting JL commands having risks or potential risks to commands with no risk such as commands that do not instruct execution of any essential operation. In such cases, these PJL commands having risks or potential risks may not be included in the prohibition list.

Figure 13:
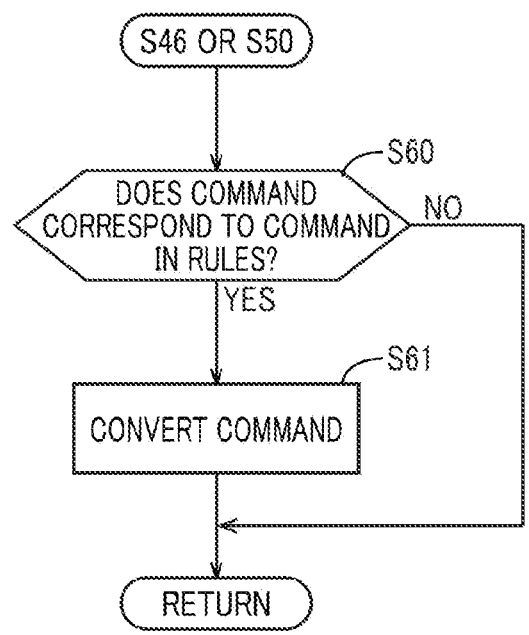
FIG. 13 is a flowchart illustrating detailed processes of S46 and S50 shown in FIG. 12.

However, when the controller 12 determines that the newly acquired PJL command is a convertible PJL command for which the conversion is permitted (S45: YES), in S46 the controller 12 executes a PJL command conversion process using the conversion rule in the conversion rule set 32. FIG. 13 is a flowchart illustrating steps in the process of S46 and the process of S50 (described later) executed by the controller 12. In S60 at the beginning of this process, the controller 12 determines whether the newly acquired PJL command corresponds to a command of a conversion rule in the conversion rule set 32. As described above, the conversion rule set 32 stores conversion rules specifying correlations between PJL commands subject to conversion ("pre-conversion PJL commands") and "post-conversion PJL commands." When the newly acquired PJL command corresponds to a "pre-conversion PJL command" included in one conversion rule of the conversion rule set 32 (S60: YES), in S61 the controller 12 converts this PJL command to the corresponding "post-conversion PJL command" in the conversion rule included in the conversion rule set 32. However, when the newly acquired PJL command does not correspond to the "pre-conversion PJL command" of any one of conversion rules included in the conversion rule set 32 (S60: NO), the controller 12 advances to S47 of FIG. 12 without converting the PJL command.

In S47 the controller 12 analyzes the PJL command of the current line and stores the detailed print instruction(s) specified in the PJL command in a volatile area of the memory 14. When the PJL command was converted in S46 according to the conversion rules included in the conversion rule set 32, in S47 the controller 12 analyzes the "post-conversion PJL command." When the PJL command was not converted in S46, in S47 the controller 12 analyzes the PJL command acquired in S42. In a case that the controller 12 determines in S44 that the command is of the PJL command type (S44: YES) and the process in S47 is executed, in S48 the controller 12 determines that a command indicating that the next line of the current line is the start line of the PDL part 42 was not detected (S48: NO) and returns to S42. In S42 the controller 12 acquires data for the next line following the current line of data. The controller 12 then repeats the process in S43-S47 described above for the newly acquired data. The series of processes of S44-S47 executed by the controller 12 is an example of a PJL command execution process.

When the controller 12 subsequently detects a command specifying that the next line of the current line is the start of the PDL part 42 through the analysis in S47, e.g., when the controller 12 detects the command D2 "@PJL ENTER LANGUAGE=PCL XL" (S48: YES), in S49 the controller 12 determines whether the command included in the data for the line following the newly acquired data (the line following the command D2 in this case) is of a PCL command type. For example, when detecting the command D2, the controller 12 may determine that the PDL part 42 containing a PCL command is described in the next line. When the controller 12 determines that the command included in the data for the next line is of the PCL command type (S49: YES), in S50 the controller 12 executes a PCL command conversion process according to the target PCL command.

Here, the PCL command conversion process executed by the controller 12 in S50 will described while referring to FIG. 13. In S60 at the beginning of this process, the controller 12 determines whether the acquired PCL command corresponds to one of the commands in the conversion rules included in the conversion rule set 32. As described above, the conversion rule set 32 stores conversion rules specifying correlations between PCL commands subject to conversion ("pre-conversion PCL commands") and "post-conversion PCL commands." When the acquired PCL command corresponds to a "pre-conversion PCL command" of the conversion rules included in the conversion rule set 32 (S60: YES), in S61 the controller 12 converts this PCL command to the corresponding "post-conversion PCL command" according to the conversion rule included in the conversion rule set 32. However, when the acquired PCL command does not correspond to the "pre-conversion PCL command" included in any of the conversion rules stored in the conversion rule set 32 (S60: NO), the controller 12 advances to S51 of FIG. 12 without converting the PCL command. When the PJL file includes a plurality of PCL commands, the controller 12 executes the PCL command conversion process for each PCL command, and advances to S51 after the PCL command conversion processes are executed for all the PCL commands.

In S51 the controller 12 executes a raster image processor (RIP) process. In the RIP process, the controller 12 generates raster data for one page in accordance with drawing instructions specified by one or more PCL commands in the PDL part 42. In other words, for one or more PCL commands that were converted in S50 according to the conversion rules in the conversion rule set 32, in S51 the controller 12 analyzes the corresponding "post-conversion PCL commands" when generating a page of raster data. For each PCL command that was not converted in S50 according to a conversion rule in the conversion rule set 32, in S51 the controller 12 analyzes the original nonconverted PCL command when generating the page of raster data. When generating one page of raster data at this time, the controller 12 uses the print instructions for the RIP process from among those print instructions stored during the analysis of PJL commands in S47. When the PDL part 42 describes image data for multiple pages, the controller 12 generates raster data for the same number of pages in the RIP process.

After completing the RIP process in S51, in S52 the controller 12 executes a printing process using the raster data for one page. In the printing process, the controller 12 converts the raster data generated in the RIP process to data that the recording member 17 can process and instructs the recording member 17 to execute a printing process based on the converted data. At this time, the controller 12 prints an image using the print instructions for the printing process from among the print instructions stored during the analysis of PJL commands in S47. After completing the printing process in S52, the controller 12 ends the process in FIG. 12. The series of the processes of S49-S52 executed by the controller 12 is an example of a PDL command execution process.

As described above, the process shown in FIG. 12 is executed in ST5 of FIG. 2 or ST12 of FIG. 10 upon receiving a PJL file specifying a print job. However, the process shown in FIG. 3 is executed in ST5 of FIG. 2 or ST12 of FIG. 10 when a PJL file not specifying any print job is received. In other words, on a condition that a PJL command is received independently of any print job, the process shown in FIG. 3 on that PJL command is executed. That is, on a condition that a PJL command is received in a manner that the PJL command is not included in any print job, the process shown in FIG. 3 on that PJL command is executed.

The embodiment described above can obtain the following effects. In a case that the controller 12 of the printer 10 receives a PJL command instructing a process that targets one or more conversion rules, the controller 12 does not execute a process in accordance with the received PJL command when the PJL command was received over the LAN interface 20 through unsecured communication. However, the controller 12 executes a process in accordance with a received PJL command instructing a process that targets one or more conversion rules when the PJL command was received via the USB interface 21. Hence, when the printer 10 is instructed through an unsecured communication to execute a process targeting one or more conversion rules, the printer 10 does not execute the process. This can enhance security for the printer 10 by preventing the conversion rule set 32 from being vulnerable to modifications.

In a case that the controller 12 receives, via the LAN interface 20, a PJL command instructing a process targeting one or more conversion rules, the controller 12 executes the process in accordance with the PJL command when the PJL command instructing the process was received according to HTTPS. This configuration can improve security for the printer 10 even when a PJL command is received via the LAN interface 20, since the controller 12 executes a process targeting one or more conversion rules when the PJL command was received according to a protocol that ensures security.

In a case that the configuration information stored in the memory 14 includes a value indicating that the PJL security setting is disabled, the controller 12 executes processes in accordance with any received PJL command targeting one or more conversion rules, even when the PJL command was received via the LAN interface 20. This enables the user to change the state of the printer 10 to one of a state executing processes targeting conversion rules and a state prohibiting execution of processes targeting conversion rules in accordance with PJL commands by modifying the value of the configuration information stored in the memory 14.

Variations of the Embodiment

In the above embodiment, the printer 10 varies the process executed after receiving a PJL command instructing the printer 10 to execute a process targeting one or more conversion rules on the basis of the type of communication interface and the type of protocol used to receive the PJL command. As an alternative, the printer 10 may vary the process executed subsequent to receiving a PJL command on the basis of on only the type of protocol used to receive the command. In this case, when the controller 12 receives a PJL command according to HTTPS (S13: YES), in S17 the controller 12 executes a process targeting one or more conversion rules in accordance with the received PJL command. However, when the PJL command was received via port 9100 protocol (S13: NO), the controller 12 proceeds to S14. In this variation, the process of S12 can be omitted from FIG. 3.

In the above embodiment, when the controller 12 receives a PJL command instructing the controller 12 to execute a process targeting one or more conversion rules, the controller 12 varies the ensuing process on the basis of the type of communication interface 18 and the type of protocol used to receive the PJL command. It is also conceivable that the printer 10 could receive a PDL command from the PC 50 instructing a process targeting one or more conversion rules to be executed. In this case, the controller 12 may determine whether or not to execute the process instructed by the PDL command on the basis of the type of communication interface 18 and the type of protocol used to receive the PDL command.

In this case, when the controller 12 receives a file from the PC 50 that contains a PDL command including the PCL command described above different from a PJL file specifying a print job, the controller 12 identifies the PDL command in S10 of FIG. 3, just as when the PJL command was identified. When the controller 12 determines in S11 that the security setting is enabled (S11: YES), in S12 the controller 12 determines whether the PDL command was received via the USB interface 21. When the PDL command was received via the USB interface 21 (S12: YES), in S17 the controller 12 executes a process targeting one or more conversion rules in accordance with the PDL command. Further, when the PDL command was received via the LAN interface 20 according to HTTPS (S13: YES), the controller 12 advances to S17 and executes the above process. However, when the PDL command was received via the LAN interface 20 through an unsecured non-HTTPS protocol (specific communication protocol) (S13: NO), the controller 12 advances to S14. After completing the processes in S14 and S15, in S16 the controller 12 executes a process to read and discard the PDL command. In this case, the series of processes S10-S17 is an example of a conversion rule targeting process when the PDL command is used.

Commands instructing to execute processes targeting one or more conversion rules are not limited to PJL commands but may be any command instructing the controller 12 to execute a process targeting one or more conversion rules. For example, the command may be a proprietary command developed by the vendor of the printer 10.

While the above embodiment limits the port using HTTPS to port 443. The present disclosure is not limited to these port numbers. Various port numbers may be used for HTTPS. Further, the port 9100 protocol is described as an example of the specific communication protocol other than HTTPS protocol. However, the specific communication protocol may be protocols not using the port 9100.

While HTTPS is employed in the above embodiment, a protocol that is a proprietary extension of HTTPS developed for the printer 10 may be used in place of HTTPS. This protocol also defines an authentication procedure, whereby the receiving device grants permission to the transmitting device to transmit data when a password received from the transmitting device could be authenticated.

While a PCL command was provided as an example of the PDL command, the PDL commands are not limited to this. For example, PDL commands may be PCL XL commands, PDF commands, or PS commands.

The embodiment describes rules associating "pre-conversion PCL commands" to "post-conversion PCL commands" as an example of the rules mapping "pre-conversion PDL commands" to "post-conversion PDL commands," but the present disclosure is not limited to these rules. For example, the rules may associate "pre-conversion PCL XL commands" to "post-conversion PCL XL commands," rules that associate "pre-conversion PDF commands" to "post-conversion PDF commands," and/or rules that association "pre-conversion PS commands" to "post-conversion PS commands."

What is claimed is:
1. A printing device comprising:
a controller;
a memory;
a first communication interface; and
a second communication interface,
wherein the controller is configured to perform:
when: the memory stores a conversion rule for converting a pre-conversion printer job language (PJL) command to a post-conversion PJL command; and a PJL command corresponding to the pre-conversion PJL command is received via the first communication interface or the second communication inter- face, a PJL command execution process to convert the received PJL command to the post-conversion PJL command according to the conversion rule and execute a process based on the post-conversion PJL command;
- on a first condition including a condition that a rule-targeting command to execute a rule-targeting process targeting the conversion rule is received via the first communication interface, which is a local area network (LAN) interface, according to a first protocol not ensuring a prescribed level of security, prohibiting execution of the rule-targeting process based on the rule-targeting command; and
- on a second condition including a condition that the rule-targeting command is received via the second communication interface different from the LAN interface, the rule-targeting process based on the rule-targeting command.

2. The printing device according to claim 1, wherein the controller is configured to perform the PJL command execution process to convert the PJL command to the post-conversion PJL command according to the conversion rule stored in the memory and execute the process based on the post-conversion PJL command regardless of whether the PJL command is received via the first communication interface according to the first protocol or a second protocol ensuring the prescribed level of security,
- wherein the controller is configured to further perform:
  - on a third condition including a condition that the rule-targeting command is received via the first communication interface according to the second protocol, the rule-targeting process based on the rule-targeting command,
- wherein the controller performs, on the first condition including the condition that the rule-targeting command is received via the first communication interface according to the first protocol, the prohibiting execution of the rule-targeting process based on the rule-targeting command.

3. The printing device according to claim 2, wherein the rule-targeting command is a rule-targeting PJL command that is a PJL command to execute the rule-targeting process,
- wherein the controller is configured to perform:
  - when a print job including a PJL command is received, a printing process based on the PJL command included in the print job regardless of whether the print job is received according to the first protocol or the second protocol, wherein when the PJL command included in the print job corresponds to the pre-conversion PJL command of the conversion rule stored in the memory, the controller is configured to convert the PJL command to the post-conversion PJL command, and execute the printing process based on the post-conversion PJL command,
- wherein the controller is configured to perform:
  - on the first condition further including a condition that the rule-targeting PJL command is received independently of any print job via the first communication interface according to the first protocol, the prohibiting execution of the rule-targeting process based on the rule-targeting PJL command; and
  - on the third condition further including a condition that the rule-targeting PJL command is received independently of any print job via the first communication interface according to the second protocol, the rule-targeting process based on the rule-targeting PJL command.

4. The printing device according to claim 2, wherein the second protocol is a protocol requiring, to ensure the prescribed level of security, a transmission device to send a password to a receiving device so that the receiving device permits the transmission device to transmit data when authentication using the password is successful,
- wherein the controller is configured to perform:
  - on the third condition further including a condition that the controller permits a transmission source to send data on the basis of successful authentication using a password received from the transmission source according to the second protocol; and a condition that the rule-targeting command is received from the transmission source via the first communication interface according to the second protocol after the controller permits the transmission source to send data, the rule-targeting process based on the rule-targeting command.

5. The printing device according to claim 4, wherein the second protocol is a hypertext transfer protocol secure (HTTPS) protocol,
- wherein the controller is configured to perform:
  - on the third condition further including: a condition that the controller permits the transmission source to send data on the basis of successful authentication using the password received from the transmission source according to the HTTPS protocol; and a condition that the rule-targeting command is received from the transmission source via the first communication interface according to the HTTPS protocol after the controller permits the transmission source to send data, the rule-targeting process based on the rule-targeting command.

6. The printing device according to claim 1, wherein the rule-targeting command is a rule-targeting PJL command that is a PJL command to execute the rule-targeting process,
- wherein the controller is configured to further perform:
  - when a print job including a PJL command is received, a printing process based on the PJL command included in the print job regardless of whether the print job is received via the first communication interface or the second communication interface, wherein when the PJL command included in the print job corresponds to the pre-conversion PJL command of the conversion rule stored in the memory, the controller is configured to convert the PJL command to the post-conversion PJL command, and execute the printing process based on the post-conversion PJL command;
- wherein the controller is configured to perform:
  - on the first condition further including a condition that the rule-targeting command is received independently of any print job via the first communication interface according to the first protocol, the prohibiting execution of the rule-targeting process based on the rule-targeting PJL command; and
  - on the second condition further including a condition that the rule-targeting PJL command is received independently of any print job via the second communication interface, the rule-targeting process based on the rule-targeting PJL command.

7. The printing device according to claim 1, wherein the controller is configured to further perform:
- setting a security setting value to a selected one of an enabled value and a disabled value; and
- when the security setting value is set to the disabled value, the rule-targeting process based on the rule-targeting command even when the rule-targeting command is received via the first communication interface according to the first protocol.

8. The printing device according to claim 1, wherein the memory is a nonvolatile memory configured to store the conversion rule,
wherein the rule-targeting command is a command to store a new conversion rule in the nonvolatile memory,
wherein the rule-targeting process includes a process to store the new conversion rule in the nonvolatile memory.

9. The printing device according to claim 1, wherein the memory is a nonvolatile memory configured to store the conversion rule,
wherein the rule-targeting command is a command to output the conversion rule stored in the nonvolatile memory,
wherein the rule-targeting process includes a process to output the conversion rule stored in the nonvolatile memory.

10. A printing device comprising:
a controller;
a memory; and
a communication interface,
wherein the controller is configured to perform:
when: the memory stores a conversion rule for converting a pre-conversion printer job language (PJL) command to a post-conversion PJL command; and a PJL command corresponding to the pre-conversion PJL command is received via the communication interface, a PJL command execution process to convert the received PJL command to the post-conversion PJL command according to the conversion rule and execute a process based on the post-conversion PJL command regardless of whether the PJL command is received via the communication interface according to a first protocol not ensuring a prescribed level of security or a second protocol ensuring the prescribed level of security;
on a first condition including a condition that a rule-targeting command to execute a rule-targeting process targeting the conversion rule is received via the communication interface according to the first protocol, prohibiting execution of the rule-targeting process based on the rule-targeting command; and
on a second condition including a condition that the rule-targeting command is received via the communication interface according to the second protocol, the rule-targeting process based on the rule-targeting command.

11. The printing device according to claim 10, wherein the rule-targeting command is a rule-targeting PJL command that is a PJL command to execute the rule-targeting process,
wherein the controller is configured to perform:
when a print job including a PJL command is received, a printing process based on the PJL command included in the print job regardless of whether the print job is received according to the first protocol or the second protocol, wherein when the PJL command included in the print job corresponds to the pre-conversion PJL command of the conversion rule stored in the memory, the controller is configured to convert the PJL command to the post-conversion PJL command, and execute the printing process based on the post-conversion PJL command,
wherein the controller is configured to perform:
on the first condition further including a condition that the rule-targeting PJL command is received independently of any print job via the communication interface according to the first protocol, the prohibiting execution of the rule-targeting process based on the rule-targeting PJL command; and
on the second condition further including a condition that the rule-targeting PJL command is received independently of any print job via the communication interface according to the second protocol, the rule-targeting process based on the rule-targeting PJL command.

12. The printing device according to claim 10, wherein the second protocol is a protocol requiring, to ensure the prescribed level of security, a transmission device to send a password to a receiving device so that the receiving device permits the transmission device to transmit data when authentication using the password is successful,
wherein the controller is configured to perform:
on the second condition further including a condition that the controller permits a transmission source to send data on the basis of successful authentication using a password received from the transmission source according to the second protocol; and a condition that the rule-targeting command is received from the transmission source via the communication interface according to the second protocol after the controller permits the transmission source to send data, the rule-targeting process based on the rule-targeting command.

13. The printing device according to claim 12, wherein the second protocol is a hypertext transfer protocol secure (HTTPS) protocol,
wherein the controller is configured to perform:
on the second condition further including: a condition that the controller permits the transmission source to send data on the basis of successful authentication using the password received from the transmission source according to the HTTPS protocol; and a condition that the rule-targeting command is received from the transmission source via the communication interface according to the HTTPS protocol after the controller permits the transmission source to send data, the rule-targeting process based on the rule-targeting command.

14. The printing device according to claim 10, wherein the memory is a nonvolatile memory configured to store the conversion rule,
wherein the rule-targeting command is a command to store a new conversion rule in the nonvolatile memory,
wherein the rule-targeting process includes a process to store the new conversion rule in the nonvolatile memory.

15. The printing device according to claim 10, wherein the memory is a nonvolatile memory configured to store the conversion rule,
wherein the rule-targeting command is a command to output the conversion rule stored in the nonvolatile memory,
wherein the rule-targeting process includes a process to output the conversion rule stored in the nonvolatile memory.

16. A printing device comprising:
a controller;
a memory;
a first communication interface; and
a second communication interface, wherein the controller is configured to perform:
when: the memory stores a conversion rule for converting a pre-conversion page description language (PDL) command to a post-conversion PDL command; and a PDL command corresponding to the pre-conversion PDL command is received via the first communication interface or the second communication interface, a PDL command execution process to convert the received PDL command to the post-conversion PDL command according to the conversion rule and execute a process based on the post-conversion PDL command;
on a first condition including a condition that a rule-targeting command to execute a rule-targeting process targeting the conversion rule is received via the first communication interface, which is a local area network (LAN) interface, according to a first protocol not ensuring a prescribed level of security, prohibiting execution of the rule-targeting process based on the rule-targeting command; and
on a second condition including a condition that the rule-targeting command is received via the second communication interface different from the LAN interface, the rule-targeting process based on the rule-targeting command.

17. The printing device according to claim 16, wherein the controller is configured to perform the PDL command execution process to convert the PDL command to the post-conversion PDL command according to the conversion rule stored in the memory and execute the process based on the post-conversion PDL command regardless of whether the PDL command is received via the first communication interface according to the first protocol or a second protocol ensuring the prescribed level of security,
wherein the controller is configured to further perform:
on a third condition including a condition that the rule-targeting command is received via the first communication interface according to the second protocol, the rule-targeting process based on the rule-targeting command,
wherein the controller performs, on the first condition including the condition that the rule-targeting command is received via the first communication interface according to the first protocol, the prohibiting execution of the rule-targeting process based on the rule-targeting command.

18. The printing device according to claim 17, wherein the second protocol is a protocol requiring, to ensure the prescribed level of security, a transmission device to send a password to a receiving device so that the receiving device permits the transmission device to transmit data when authentication using the password is successful,
wherein the controller is configured to perform:
on the third condition further including a condition that the controller permits a transmission source to send data on the basis of successful authentication using a password received from the transmission source according to the second protocol; and a condition that the rule-targeting command is received from the transmission source via the first communication interface according to the second protocol after the controller permits the transmission source to send data, the rule-targeting process based on the rule-targeting command.

19. The printing device according to claim 18, wherein the second protocol is a hypertext transfer protocol secure (HTTPS) protocol,
wherein the controller is configured to perform:
on the third condition further including: a condition that the controller permits the transmission source to send data on the basis of successful authentication using the password received from the transmission source according to the HTTPS protocol; and a condition that the rule-targeting command is received from the transmission source via the first communication interface according to the HTTPS protocol after the controller permits the transmission source to send data, the rule-targeting process based on the rule-targeting command.

20. The printing device according to claim 16, wherein the rule-targeting command is a rule-targeting PDL command that is a PDL command to execute the rule-targeting process,
wherein the controller is configured to further perform:
when a print job including a PDL command is received, a printing process based on the PDL command included in the print job regardless of whether the print job is received via the first communication interface or the second communication interface, wherein when the PDL command included in the print job corresponds to the pre-conversion PDL command of the conversion rule stored in the memory, the controller is configured to convert the PDL command to the post-conversion PDL command, and execute the printing process based on the post-conversion PDL command;
wherein the controller is configured to perform:
on the first condition further including a condition that the rule-targeting command is received independently of any print job via the first communication interface according to the first protocol, the prohibiting execution of the rule-targeting process based on the rule-targeting PDL command; and
on the second condition further including a condition that the rule-targeting PDL command is received independently of any print job via the second communication interface, the rule-targeting process based on the rule-targeting PDL command.

21. The printing device according to claim 17, wherein the rule-targeting command is a rule-targeting PDL command that is a PDL command to execute the rule-targeting process,
wherein the controller is configured to perform:
when a print job including a PDL command is received, a printing process based on the PDL command included in the print job regardless of whether the print job is received according to the first protocol or the second protocol, wherein when the PDL command included in the print job corresponds to the pre-conversion PDL command of the conversion rule stored in the memory, the controller is configured to convert the PDL command to the post-conversion PDL command, and execute the printing process based on the post-conversion PDL command,
wherein the controller is configured to perform:
on the first condition further including a condition that the rule-targeting PDL command is received independently of any print job via the first communication interface according to the first protocol, the prohibiting execution of the rule-targeting process based on the rule-targeting PDL command; and
on the third condition further including a condition that the rule-targeting PDL command is received independently of any print job via the first communication interface according to the second protocol, the rule-targeting process based on the rule-targeting PDL command.

22. The printing device according to claim 16, wherein the controller is configured to further perform:
setting a security setting value to a selected one of an enabled value and a disabled value; and
when the security setting value is set to the disabled value, the rule-targeting process based on the rule-targeting command even when the rule-targeting command is received via the first communication interface according to the first protocol.

23. The printing device according to claim 16, wherein the memory is a nonvolatile memory configured to store the conversion rule,
wherein the rule-targeting command is a command to store a new conversion rule in the nonvolatile memory,
wherein the rule-targeting process includes a process to store the new conversion rule in the nonvolatile memory.

24. The printing device according to claim 16, wherein the memory is a nonvolatile memory configured to store the conversion rule,
wherein the rule-targeting command is a command to output the conversion rule stored in the nonvolatile memory,
wherein the rule-targeting process includes a process to output the conversion rule stored in the nonvolatile memory.

25. A printing device comprising:
a controller;
a memory; and
a communication interface,
wherein the controller is configured to perform:
when: the memory stores a conversion rule for converting a pre-conversion page description language (PDL) command to a post-conversion PDL command; and a PDL command corresponding to the pre-conversion PDL command is received via the communication interface, a PDL command execution process to convert the received PDL command to the post-conversion PDL command according to the conversion rule and execute a process based on the post-conversion PDL command regardless of whether the PDL command is received via the communication interface according to a first protocol not ensuring a prescribed level of security or a second protocol ensuring the prescribed level of security;
on a first condition including a condition that a rule-targeting command to execute a rule-targeting process targeting the conversion rule is received via the communication interface according to the first protocol, prohibiting execution of the rule-targeting process based on the rule-targeting command; and
on a second condition including a condition that the rule-targeting command is received via the communication interface according to the second protocol, the rule-targeting process based on the rule-targeting command.

26. The printing device according to claim 25, wherein the second protocol is a protocol requiring, to ensure the prescribed level of security, a transmission device to send a password to a receiving device so that the receiving device permits the transmission device to transmit data when authentication using the password is successful,
wherein the controller is configured to perform:
on the second condition further including a condition that the controller permits a transmission source to send data on the basis of successful authentication using a password received from the transmission source according to the second protocol; and a condition that the rule-targeting command is received from the transmission source via the communication interface according to the second protocol after the controller permits the transmission source to send data, the rule-targeting process based on the rule-targeting command.

27. The printing device according to claim 26, wherein the second protocol is a hypertext transfer protocol secure (HTTPS) protocol,
wherein the controller is configured to perform:
on the second condition further including: a condition that the controller permits the transmission source to send data on the basis of successful authentication using the password received from the transmission source according to the HTTPS protocol; and a condition that the rule-targeting command is received from the transmission source via the communication interface according to the HTTPS protocol after the controller permits the transmission source to send data, the rule-targeting process based on the rule-targeting command.

28. The printing device according to claim 25, wherein the rule-targeting command is a rule-targeting PDL command that is a PDL command to execute the rule-targeting process,
wherein the controller is configured to perform:
when a print job including a PDL command is received, a printing process based on the PDL command included in the print job regardless of whether the print job is received according to the first protocol or the second protocol, wherein when the PDL command included in the print job corresponds to the pre-conversion PDL command of the conversion rule stored in the memory, the controller is configured to convert the PDL command to the post-conversion PDL command, and execute the printing process based on the post-conversion PDL command,
wherein the controller is configured to perform:
on the first condition further including a condition that the rule-targeting PDL command is received independently of any print job via the communication interface according to the first protocol, the prohibiting execution of the rule-targeting process based on the rule-targeting PDL command; and
on the second condition further including a condition that the rule-targeting PDL command is received independently of any print job via the communication interface according to the second protocol, the rule-targeting process based on the rule-targeting PDL command.

29. The printing device according to claim 25, wherein the memory is a nonvolatile memory configured to store the conversion rule,
wherein the rule-targeting command is a command to store a new conversion rule in the nonvolatile memory,
wherein the rule-targeting process includes a process to store the new conversion rule in the nonvolatile memory.

30. The printing device according to claim 25, wherein the memory is a nonvolatile memory configured to store the conversion rule, wherein the rule-targeting command is a command to output the conversion rule stored in the nonvolatile memory, wherein the rule-targeting process includes a process to output the conversion rule stored in the nonvolatile memory.

* * * * *